United States Patent [19]

Broderdorf et al.

[11] Patent Number: 5,121,611
[45] Date of Patent: Jun. 16, 1992

[54] REFRIGERATION APPARATUS AND METHOD OF REFRIGERATION

[75] Inventors: Walter C. Broderdorf, Wooster, Ohio; Jose M. N. Camacho, Cicero, Ill.; Stephen F. Donohue, Hutchinson, Kans.; Donald S. Finan; Robert J. Ogarek, both of Chicago, Ill.; Martin M. Reynolds, Scottsdale, Ariz.; Gary D. Lang, Wooster, Ohio

[73] Assignee: Liquid Carbonic Corporation, Chicago, Ill.

[21] Appl. No.: 603,533

[22] Filed: Oct. 25, 1990

[51] Int. Cl.$^5$ .............................. F25D 17/02
[52] U.S. Cl. ................... 62/374; 62/48.2; 62/381
[58] Field of Search ................ 62/381, 374, 48.2

[56] References Cited

U.S. PATENT DOCUMENTS

| | | | |
|---|---|---|---|
| 3,007,319 | 11/1961 | Ogden | 62/64 |
| 3,292,384 | 12/1966 | Rubin | 62/381 |
| 3,765,189 | 10/1973 | Le Diouron | 62/346 |
| 4,098,095 | 7/1978 | Roth | 62/346 |
| 4,127,008 | 11/1978 | Tyree, Jr. | 62/62 |
| 4,224,801 | 9/1980 | Tyree, Jr. | 62/48 |
| 4,337,627 | 7/1982 | Roth | 62/346 |
| 4,349,575 | 9/1982 | Roth | 426/513 |
| 4,886,534 | 12/1989 | Castan | 62/48.2 |
| 4,914,927 | 10/1990 | Miller et al. | 62/381 |

FOREIGN PATENT DOCUMENTS

332287  1/1989  European Pat. Off. .

Primary Examiner—Ronald C. Capossela
Attorney, Agent, or Firm—Fitch, Even, Tabin & Flannery

[57] ABSTRACT

Refrigeration apparatus for cooling or freezing products such as protein materials includes a drum through which heat transfer fluid is circulated. A belt is wrapped around part of the drum surface and the product to be refrigerated is applied to the drum surface, being pressed thereagainst by the belt. Either liquid or triple point carbon dioxide is circulated through the drum to cool the product in contact therewith. Other heat transfer fluids such as D-Limonene or DOWTHERM may also be circulated through the drum. A tank and related apparatus for cooling the heat transfer fluid is also disclosed.

6 Claims, 4 Drawing Sheets

REFRIGERATION APPARATUS AND METHOD OF REFRIGERATION

BACKGROUND OF THE INVENTION

1. Field of the Invention

The present invention pertains to drum freezers, and in particular to such freezers cooled by a liquid cryogen or other heat transfer fluid.

2. Description of the Related Art

There are many advantages to cryogenic freezing of food products which have come to light in the past several decades, and in a number of instances, carbon dioxide is the cryogen of choice for efficient and economical cryogenic freezing applications. Cryogenic carbon dioxide food freezers often utilize liquid carbon dioxide under pressure sufficient to maintain it in the liquid state and supply it to spray nozzles through which it is injected into the interior of a thermally insulated enclosure wherein the food products to be frozen are delivered to a freezing region, as by being transported on an endless conveyor or the like. In a $CO_2$ food freezer, the low temperatures which can be achieved by the creation of solid $CO_2$, can create a tendency for liquid $CO_2$ in the lines leading to the spray nozzles to freeze, particularly at times when there is no flow or only very low flow. Gassing systems have been devised and utilized to clear the lines of liquid $CO_2$ at certain times to prevent such freezing.

It is well known in the art to use drum flakers in the chemical process industry and to a lesser extent, in the food manufacturing industry. Drums have also been used for cooling or freezing various products, including protein materials, as will be discussed herein. Typical cooling media for drum coolers or freezers are water, chilled water, refrigerated brine solutions, fluorocarbon refrigerants, such as chloro-fluorocarbons or chlorofluoro-hydrocarbons (CFC's or HCFC's), and mechanically refrigerated ammonia. The use of liquid nitrogen as a heat transfer media for cooling drums has never been successfully commercialized. Drum freezers are very efficient for cooling or freezing, (i.e., solidifying) liquid or semi-soft foods or chemical products as compared to other, conventional methods such as trickle chillers, plate or tray freezers, or blast freezer rooms.

For example, a variety of products, such as hamburger meat and other protein materials are prepared as a viscous paste and applied to the surface of a refrigerated drum, which is cooled to a sufficiently low temperature so as to cause freezing of the protein material into a continuous sheet. For example, U.S. Pat. Nos. 4,098,095; 4,337,627; and 4,349,575 disclose cooling drums for a freezing viscous paste of hamburger meat and the like protein materials.

In U.S. Pat. No. 4,098,095, a fluid refrigerant such as FREON or ammonia is circulated through the interior of the drum and the drum is rotated, in synchronism with a belt surrounding a portion of the drum surface. A viscous paste is applied to a portion of the cooling drum surface located upstream of the belt. The paste material is spread uniformly across the drum surface, and the paste material adheres to the drum surface with freezing occurring upon contact with the drum surface, or shortly thereafter. As the viscous paste travels with the drum surface, interior portions of the paste blanket become frozen and eventually the surface of the paste blanket remote from the drum surface also freezes. The paste blanket rotates with the drum to contact the belt. The belt presses the blanket against the cooling drum surface to aid in the uniform distribution of paste material across the drum surface, thereby providing a blanket of consistent, uniform thickness. The blanket emerging from the downstream end of the belt is drawn away from the surface of the freezing drum by a knife blade, and is passed to processing equipment located downstream of the refrigeration apparatus.

U.S. Pat. No. 4,337,627 discloses a similar arrangement of a cooling drum and a conveyor belt surrounding a portion of the drum surface. The temperature of the viscous paste and of the cooling drum are maintained such that the viscous paste sticks to the drum surface shortly after contact therewith.

U.S. Pat. No. 4,349,575, also by the same inventor, discloses a refrigeration drum with a conveyor belt surrounding a major portion of the drum surface. The viscous paste is fed into a nip formed between the upstream end of the conveyor belt and the drum surface, the conveyor belt pressing the viscous paste into contact with the drum surface and maintaining such pressure as the paste travels with the rotating drum. The conveyor belt holds the viscous paste in contact with the drum before and after freezing of the paste is completed.

European Patent Application No. 332,287 discloses a drum freezer for egg products. Liquid nitrogen is circulated in the drum interior while liquid egg products are deposited, drop by drop on the drum surface. Upon contact with the drum surface, the drops freeze and are collected for transport or further processing. A conveyor belt surrounding the drum surface is not employed.

There is a continuing demand for an improved drum freezer apparatus resulting in increased economy and increased throughput capability.

SUMMARY OF THE INVENTION

It is an object according to the present invention to provide refrigeration apparatus having a drum cooled by liquid and triple point carbon dioxide, that is, carbon dioxide where all three phases (solid, liquid and gas) are present.

Another object according to the present invention is to provide a refrigeration apparatus which uses a heat transfer fluid commonly known as D-Limonene, or, alternatively, DOWTHERM, and to provide improved methods and apparatus for the cooling of the D-Limonene heat transfer fluid, to prevent air infiltration and to provide other advantages.

These and other objects according the present invention, which will become apparent from studying the appended Description and Drawings, are provided in a refrigeration apparatus for cooling a product comprising:

- a drum of heat conducting material, having an outer wall of cylindrical or some other shape with an outer product-contacting surface and defining an internal cavity;
- means for rotatably mounting said drum;
- storage means for storing carbon dioxide refrigerant;
- means for introducing the carbon dioxide refrigerant into the internal cavity of the drum;
- means for contacting the product with the outer drum surface so that the carbon dioxide refrigerant absorbs heat from the product, causing at least a portion of the carbon dioxide in the drum cavity to vaporize;

means for removing the product from the outer drum surface;

means for exhausting carbon dioxide vapor from the drum internal cavity; and means for liquefying the exhausted carbon dioxide vapor and for returning the carbon dioxide liquid to the storage means.

The carbon dioxide refrigerant can be either in the liquid or possibly the triple phase state.

Other objects according to the present invention are provided in a refrigeration apparatus for cooling a product, comprising:

a drum of heat conducting material, having an outer cylindrical wall with an outer product-contacting surface and defining an internal cavity;

means for cooling the drum;

means for rotatably mounting said drum;

flexible webbing surrounding at least a portion of the drum for maintaining the product in contact with the drum outer surface;

means for mounting the webbing to follow movement of the drum surface; and means for depositing a solid coolant on the flexible webbing to cool product surfaces which are out of contact with the drum outer surface.

Further objects according to the present invention are provided in apparatus for cooling a heat transfer fluid, such as D-Limonene, comprising:

a cooling tank for holding the heat transfer fluid, including outlet means for discharge of the heat transfer fluid when cooled;

injecting means submerged in the heat transfer fluid for injecting a liquid coolant therein to effect turbulent mixing therewith, with heat being absorbed from the heat transfer fluid so as to vaporize the coolant, with said coolant vapor passing out of said heat transfer fluid; and a separator member disposed in said heat transfer fluid between said injecting means and said outlet means to prolong the residence time of the coolant in the cooling tank to promote vaporization of the coolant, thereby preventing coolant from being carried directly from said injecting means to said outlet means.

The injecting means preferably comprise a submerged manifold with spray nozzles spaced therealong to inject a liquid coolant such as carbon dioxide.

BRIEF DESCRIPTION OF THE DRAWINGS

In the drawings, wherein like elements are referenced alike.

DETAILED DESCRIPTION OF THE PREFERRED EMBODIMENT

Figure 1:
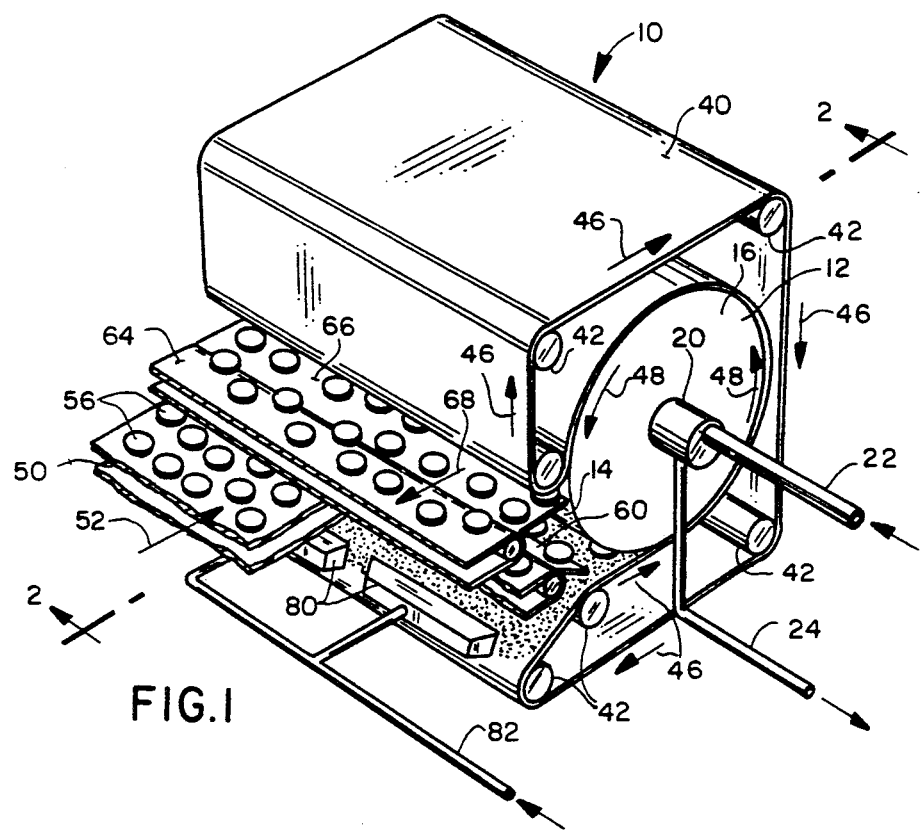
FIG. 1 is a perspective view of a refrigeration apparatus according to principles of the present invention.
Figure 2:
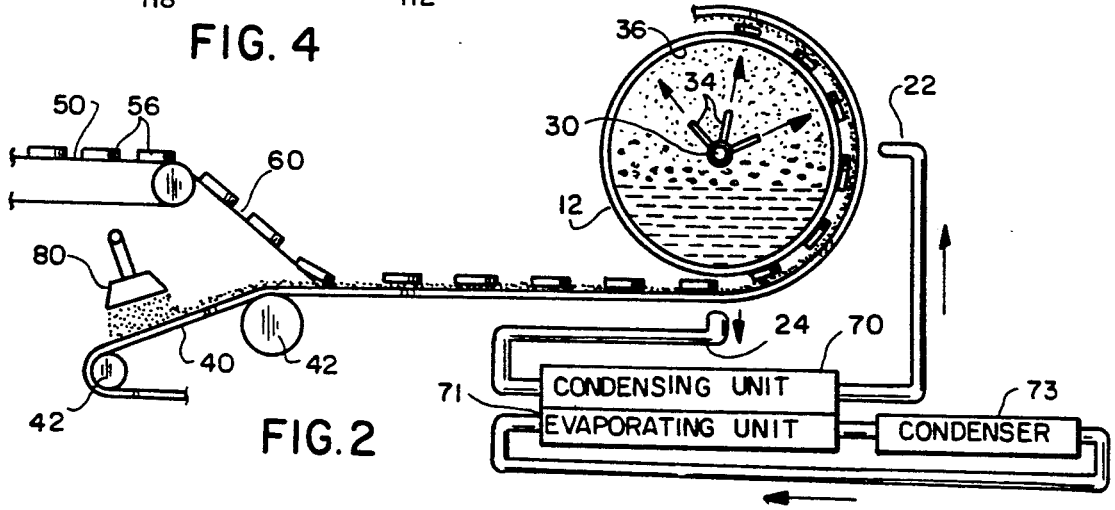
FIG. 2 is a fragmentary, cross-sectional view taken along the lines 2—2 of FIG. 1.

Referring now to the drawings, and initially to FIGS. 1 and 2, a refrigeration apparatus is generally indicated at 10. The refrigeration apparatus comprises a conventional freezing drum 12 of heat conducting material such as metal, including a cylindrical working surface 14 and annular endwalls 16. A coaxial connector 20 is mounted to one endwall 16, to provide connection for an inlet line 22 and an outlet line 24. Referring to FIG. 2, the inlet line 22 is coupled through connector 20 to a distribution manifold 30 disposed in the interior of freezing drum 12, preferably adjacent the longitudinal axis thereof. A plurality of nozzles 34 are connected at points along manifold 30, and direct heat transfer fluid carried in inlet line 22 toward the inner surface 36 of drum 12.

An endless conveyor belt 40 surrounds a portion of the working surface 14 of drum 12. The conveyor belt 40 travels about a series of guide rollers 42, and preferably one of the rollers 42 is driven by motor 172 (see FIG. 5) so as to propel conveyor belt 40 in the direction of arrows 46. The freezing drum 12 is preferably motor-driven for rotation in the direction of arrows 48, and preferably the speed of rotation of drum 12 and the speed of travel of belt 40 are matched.

A feed conveyor 50 delivers a plurality of products 56 to be frozen in the direction of arrow 52, directing the products toward the opening of conveyor belt 40. The feed conveyor 50 deposits products 56 onto a loading ramp 60, the products being directed onto belt 40 immediately upstream of the nip formed between belt 40 and working surface 14 of drum 12. The products are carried by belt 40 into contact with working surface 14 as the belt conforms to working surface 14. Belt 40 continually presses the products 56 against working surface 14 as the products are advanced toward take up conveyor 64. The products are discharged onto a loading ramp 66, and travel thereacross in the direction of arrow 68 so as to be deposited on take up belt 64.

The heat transfer fluid in inlet line 22 may comprise any suitable material, such as ammonia, which is typically operated at negative pressures. Other conventional materials such as D-Limonene described in U.S. Pat. No. 3,597,355 may also be used, and the D-Limonene may be cooled by injecting liquid carbon dioxide, as explained in the patent. However, according to other aspects of the present invention, the heat transfer fluid in the drum may also comprise carbon dioxide operated at low pressures of about 300 psig. or less, and more preferably at drum pressures ranging between 125 psig. and 60 psig. Most preferably, the carbon dioxide is maintained at a pressure of about 125 psig. These pressure operating ranges have been found to provide very attractive heat transfer rates without requiring vacuum vessel constructions for the drum, as is needed for ammonia systems. Also, with the present invention, high pressure (i.e., significantly greater than 300 psig.) vessel constructions are avoided.

The carbon dioxide heat transfer medium operated at pressures between 60 psig. and 300 psig. preferably comprises a boiling liquid, and may comprise triple point carbon dioxide, that is, carbon dioxide in which all three phases (solid, liquid and gas) are in equilibrium.

Referring to FIG. 2, the carbon dioxide is fed through manifold 30 to nozzles 34, impinging on the inner surface 36 of drum 12. The gaseous component of the triple point carbon dioxide fills the upper portion of drum 12, while the liquid and any solid components accumulate in a pool at the bottom of drum 12, as indicated in FIG. 2. The drum may also be operated in a "flooded" or nearly filled condition, as well.

Referring again to FIG. 2, the gaseous component of the carbon dioxide heat transfer medium exits drum 12 through line 24. According to one aspect of the present invention, the warm carbon dioxide heat transfer medium is mechanically condensed in a condenser stage 70 which is cooled via an external refrigerant in an external refrigeration loop. The external refrigerant may comprise CFCs or HCFCs for example, which cools the carbon dioxide to its described operating point, with cooled carbon dioxide exiting condensing unit 70 and returning to drum 12 through feed line 22.

As an alternative, the carbon dioxide can be released from the system as an expendable, or it may be cooled to its triple point or to a liquid state which enters drum 12 through feed line 22, to provide cooling therefor. The carbon dioxide vapor exiting drum 12 may be cooled by liquid nitrogen in unit 70, for example, but preferably is cooled to a liquid phase or to a triple point (solid, liquid vapor phase) by a mechanical refrigeration system (including a condenser, evaporator, and compressor, for example) where the carbon dioxide compressor stage is cooled by the evaporator of a second mechanical refrigeration system using CFCs or HCFCs or ammonia or some other medium as the heat transfer fluid. As shown in FIG. 2, for example, the condenser 70 is cooled by the evaporator 71 of an external refrigerating unit 73 including a loop with a second condenser unit in which the warm heat transfer fluid (e.g. CFCs or HCFCs or ammonia) is mechanically compressed.

The drum illustrated in the drawings effectively has an inner cylindrical surface formed by the manifold 30. The diameter of manifold 30 is much smaller than the diameter of the drum outer surface. The present invention also contemplates drums, or so-called "wheels," in which the inner surface of the drum has a diameter only slightly smaller than the outer surface of the drum. The manifold for the alternative drum may include radially oriented distribution conduits.

Referring again to FIGS. 1 and 2, the drum belt is treated with carbon dioxide snow prior to receiving the product 56. FIG. 1 shows a pair of conventional snow horns 80 which are fed liquid carbon dioxide in line 82, expanding the carbon dioxide to form snow. The rapid expansion of the liquid carbon dioxide causes snow being produced in the horns 80 to be directed toward conveyor belt 40, thus depositing a blanket of snow on the belt surface, immediately upstream of loading ramp 60. Thus, the products 56 being loaded onto belt 40 are placed atop a blanket of carbon dioxide snow which remains in contact with the products 56 as they travel about the surface of freezing drum 12. The belt 40 is pressed against the cooling drum, and squeezes out air pockets which would otherwise be trapped between the products 56. If desired, the belt 40 can be made slightly porous, the packed snow filling the pores to prevent extrusion of the food products therethrough.

Figure 4:
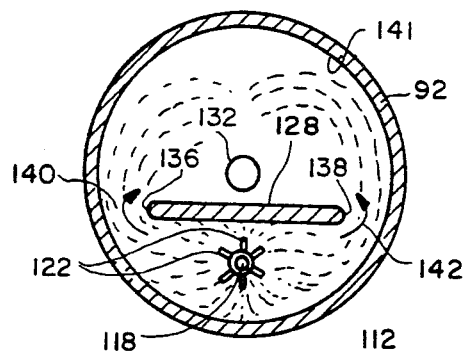
FIG. 4 is a cross-sectional view of the cooling tank taken along the lines 4—4 of FIG. 3.
Figure 3:
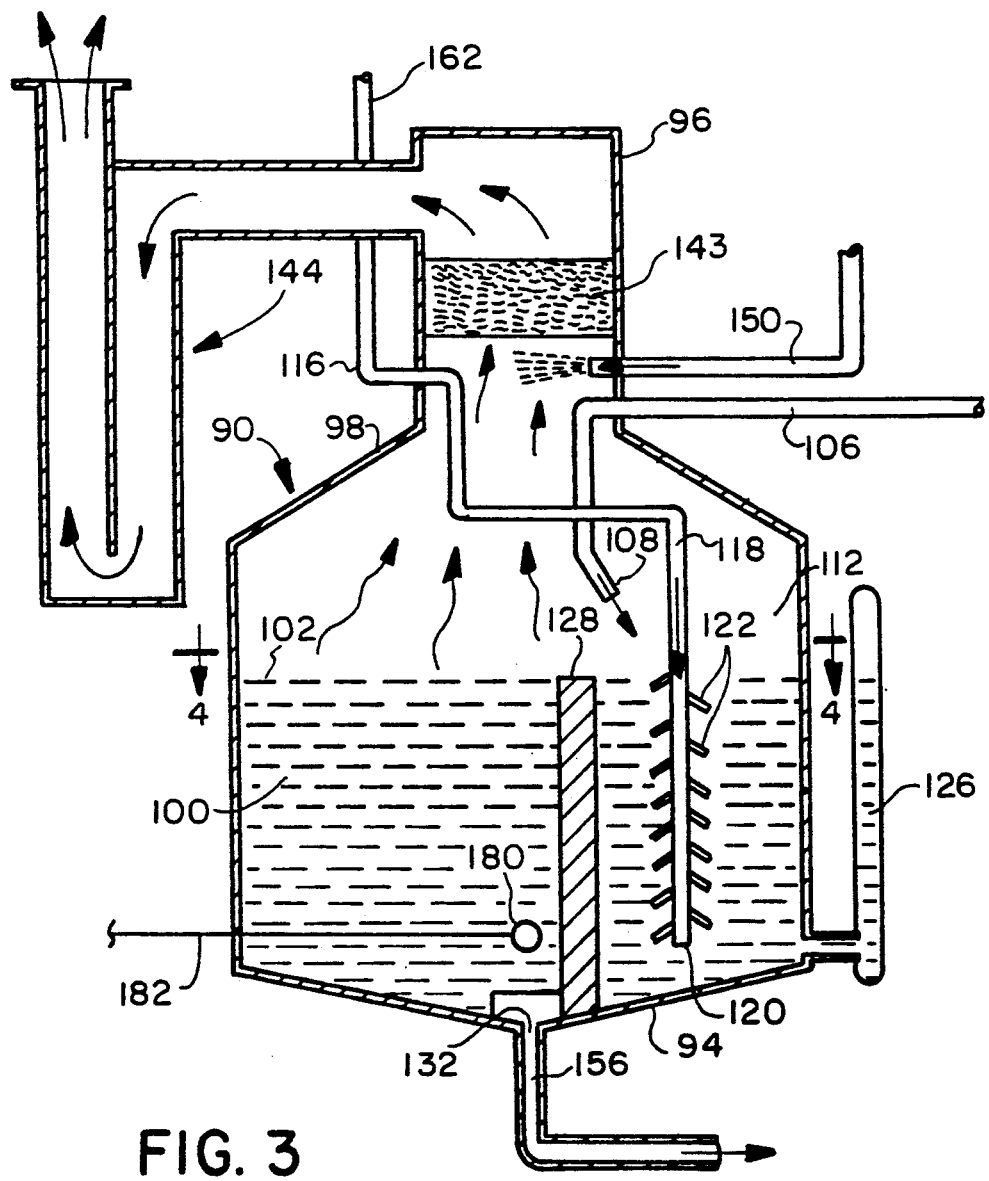
FIG. 3 is a cross-sectional elevational view of a cooling tank for treating a heat transfer fluid according to principles of the present invention.
Figure 5:
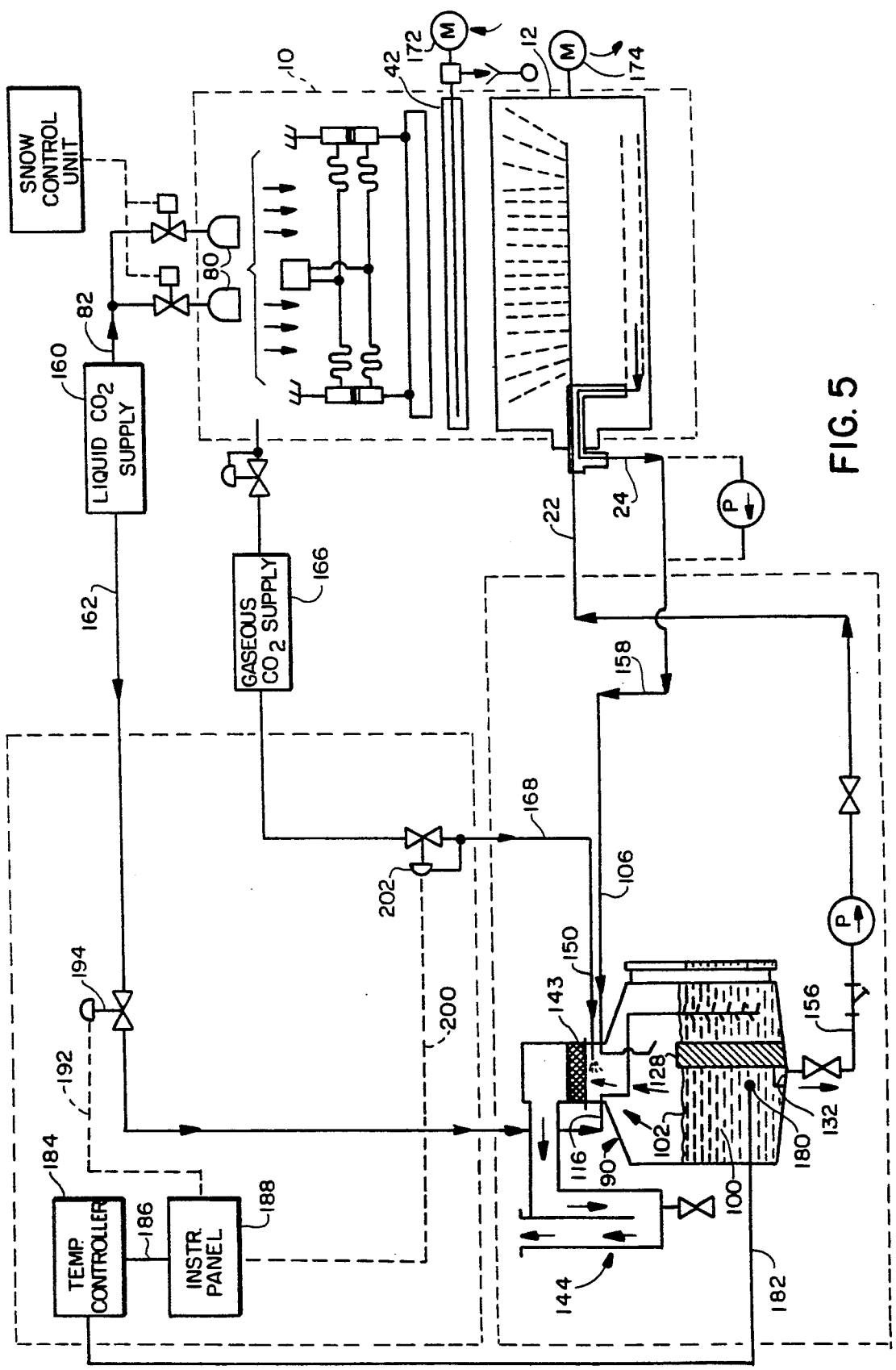
FIG. 5 is a schematic diagram of a refrigeration system, using the cooling tank of FIGS. 3 and 4.

Turning now to FIGS. 3–5, an additional aspect of the present invention will be described with reference to the use of carbon dioxide to cool a heat transfer fluid commonly known as D-Limonene. This fluid is environmentally safe as compared to other solvents used for this purpose and the present invention, in one of its aspects, contemplates the use of D-Limonene as a heat transfer fluid for refrigerating a cooling drum, where the D-Limonene fluid is warmed. A commercially practical cooling system using D-Limonene must prevent loss of the D-Limonene wherever possible, and an efficient arrangement for cooling the D-Limonene must be provided.

A cooling tank generally indicated at 90 includes a generally cylindrical body portion 92 and a tapered bottom wall 94. Cooling tanks of other shapes could also be employed. The cooling tank further includes a neck portion 96 connected to the cylindrical body portion 92 by an intermediate converging portion 98. The D-Limonene heat transfer fluid 100 fills the majority of the cylindrical body portion, and has an upper surface 102. An inlet line 106 for warm D-Limonene heat transfer fluid enters the upper portion of cooling tank 90 and is connected to a nozzle 108 which directs the heat transfer fluid into region 112 of cooling tank 90. An inlet line 116 is provided for directing a coolant, preferably liquid carbon dioxide, to a manifold 118. As illustrated in FIG. 3, manifold 118 extends below surface 102 of the D-Limonene heat transfer fluid. The manifold 118 has a lower free end 120 spaced above the bottom wall 94 of the tank. A plurality of nozzles 122 are distributed along manifold 118 and direct liquid carbon dioxide coolant into the D-Limonene heat transfer fluid, in region 112.

A level indicator 126 is provided for monitoring the level of D-Limonene heat transfer fluid in cooling tank 90. A barrier wall 128 is located in cooling tank 90, extending upwardly from the bottom wall 94 thereof. Preferably, the fluid surface 102 extends slightly below the top of barrier wall 128. The bottom wall 94 is preferably tapered, sloping toward a discharge opening 132. The barrier wall 128 is preferably located to one side of the discharge opening and cooperates with the cylindrical wall portion 92 to define the region 112. As can be seen in FIG. 4, the barrier wall 128 has opposed vertical edges 136, 138 spaced from the inner surface of cylindrical wall 92. Accordingly, flow channels 140, 142 are formed on either side of barrier wall 128.

A coolant, preferably liquid carbon dioxide, is injected into the D-Limonene heat transfer fluid to extract heat therefrom. The number, spacing and direction of the nozzles 122 relative to the barrier wall 128 and the inner surface 141 of the tank wall are chosen to produce a turbulent mixing of the injected coolant with, the D-Limonene heat transfer fluid. In the preferred embodiment, the liquid carbon dioxide is injected at pressures up to 300 psig. The flow rate of liquid carbon dioxide is controlled to obtain a given temperature of D-Limonene heat transfer fluid returning in line 106, so that the liquid carbon dioxide is vaporized, bubbling out of the D-Limonene heat transfer fluid.

It is preferred that the coolant injected into the D-Limonene heat transfer fluid is not entrained in the cooled fluid discharged through opening 132. The barrier wall 128 according to the present invention achieves this objective in at least two ways, by confining the mixing area to insure at least a minimum turbidity, and to lengthen the residence time of the injected coolant in the D-Limonene heat transfer fluid prior to discharge of the fluid from the cooling tank 92. The region 112 functions as a mixing chamber of carefully controlled proportions and configuration. The barrier wall 128 also prevents development of a whirlpool flow pattern in cooling tank 92, further insuring the desired mixing and prolonged residence of the coolant in the D-Limonene heat transfer fluid.

After mixing in region 112, the D-Limonene/carbon dioxide mixture passes around the vertical edges of barrier wall 128, through flow channels 140, 142 in the direction indicated by the arrows in FIG. 4. A portion of the liquid carbon dioxide is vaporized in region 112 and rises to the upper portion of tank 90. With continued mixing, the liquid carbon dioxide entrained in the flow through channels 140, 142 vaporizes as the mixture moves toward discharge opening 132, again, with carbon dioxide vapor passing to the upper portions of the cooling tank.

As indicated in FIG. 3, it is generally preferred that the surface 102 of the D-Limonene heat transfer fluid be maintained below the upper end of the cylindrical body portion 92. In the preferred embodiment, the D-Limonene heat transfer fluid fills approximately two-thirds of cooling tank 92, leaving approximately one-third of the tank volume for collection of carbon dioxide vapor.

Under pressure of the evolved carbon dioxide vapor, the upward flow velocity of the gaseous carbon dioxide increases in the converging transition portion 98, with the carbon dioxide vapor entering the neck portion 96 of tank 90. It has been found that particles of D-Limonene fluid may be entrained with the carbon dioxide vapor, and it is desirable for economic operation of the system that the D-Limonene be retained in cooling tank 92. Accordingly, there is provided a demister pad 143. The demister pad 143 is preferably of a wire mesh type, which is available commercially. The D-Limonene heat transfer fluid rejected by the demister pad 143 accumulates on the wall of neck 96, and flows downwardly under gravity across the inner surface of the tank to join the fluid present therein.

The carbon dioxide vapor passes through demister pad 143 toward a conventional labyrinthine anti-backflow device. As shown, the anti-backflow device comprises a heavy gas U-trap, but may be replaced by a low pressure check valve if desired, depending, for example, upon the gas density of the coolant at ambient conditions. The anti-backflow device prevents warm, moist ambient air from flowing into cooling tank 90 through the neck portion 96. To further aid in eliminating backflow, an inlet line 150 is located in neck portion 96, below demister pad 143. A purging flow of dry gas is fed in line 150 when the cooling tank is "idling", that is, when coolant vapor production falls off. This will occur, for example, when the temperature of the D-Limonene heat transfer fluid is sufficiently low. A steady flow of dry cryogen gas is introduced at the upper end of cooling tank 90 to preclude ambient air from entering the cooling tank. Without the anti-backflow device and the vapor purge system, moisture may condense on the cold surface of the D-Limonene heat transfer fluid, forming water ice which prevents or otherwise hampers pumping of the fluid through the system.

The chilled D-Limonene fluid is pumped to the rotating drum freezer 12. The D-Limonene, under pressure, enters into a fixed distribution header mounted inside the drum freezer, and evolves by pressure from the distribution header throughout a series of orifices of spray nozzles arranged to direct the D-Limonene solution to coat the upper portion of the drum freezer inner surface. D-Limonene is relatively easy to pump, even at temperatures as low as −140° F. Quite importantly, the direct contact of D-Limonene with liquid carbon dioxide will not cause freezing of the D-Limonene solution, and this represents a significant improvement over the direct contact refrigeration of other types of heat transfer fluids, which have been known to freeze, thus introducing material handling problems when attempts are made to apply the refrigerated fluid in a useful manner. Optimum heat transfer rates are achieved in part, by a high wetting of the uppermost part of the drum freezer inner surface with the coldest refrigerated D-Limonene solution. After the D-Limonene is warmed by the products to be cooled or frozen, it falls to the bottom of the drum freezer.

It is preferred that a flow of carbon dioxide vapor is maintained in the drum to force the warmed D-Limonene solution to the liquid return line. A relatively low pressure, 5 psig., has been found sufficient for this purpose. The flow of carbon dioxide vapor into the freezer drum also provides the added advantage of preventing moisture buildup on the interior drum surface as would result from entry of air into the drum interior. In addition to causing a degradation of the D-Limonene fluid, moisture in the drum would reduce the freezing rate.

Referring now to FIG. 5, a schematic diagram of a refrigerating system including the cooling tank 90 and the refrigerating drum 12, is shown. Cooled D-Limonene heat transfer fluid is discharged from tank 90 and carried by conduit 156 to the inlet line 22 of freezer drum 12. D-Limonene flowing out of freezing drum 12 on line 24 is carried along conduit 158 to the inlet line 106 of cooling tank 90. A source of liquid carbon dioxide is schematically indicated at 160 and is connected to inlet 116 of cooling tank 90 through conduit 162. The supply line 82 is also connected to the liquid carbon dioxide supply 160, to provide a feed for snow horns 80.

A source of gaseous carbon dioxide is schematically indicated at 166 and is connected to the inlet 150 through a conduit 168. The supply of gaseous carbon dioxide can comprise a pressurized tank, or if sufficient quantities of carbon dioxide vapor are generated in cooling tank 90, they can be retained in a storage vessel for later use.

The refrigerating apparatus 10 schematically illustrated in FIG. 5 includes a drive motor 172 which drives a roller 42, thus propelling conveyor belt 40 at a controlled rate of speed. This speed is synchronized with a motor 174 which rotatably drives freezing drum 12, in synchronism with conveyor belt 40.

Referring to FIGS. 3 and 5, a temperature sensor 180 sends a temperature signal along conductor 182 to a temperature controller 184. The temperature controller 184 is in turn coupled through conductor 186 to an instrument panel 188. The instrument panel 188 controls the flow of liquid carbon dioxide and gaseous carbon dioxide into cooling tank 90. The instrument panel is coupled through conductor 192 to a control valve 194 in conduit 162. Thus, when temperature sensor 180 detects a sufficient cooling of the D-Limonene heat transfer fluid, a signal is sent by instrument panel 188 to reduce the flow through valve 194. The instrument panel 188 preferably includes means for sensing the signal on conductor 192, indicating the rate of flow of liquid carbon dioxide in conduit 162. In response thereto, instrument panel 188 issues a signal on conductor 200 opening control valve 202 when the flow of liquid carbon dioxide is sufficiently low as to require a purge flow of carbon dioxide vapor into the neck of cooling tank 90. Thus, for sufficiently high flow rates of liquid carbon dioxide into cooling tank 90 correspondingly large flow rates of carbon dioxide vapor will be generated by bubbling through the D-Limonene heat transfer fluid 100, thus further insuring that ambient air will not flow back into the cooling tank.

Circuitry means are preferably provided in instrument panel 188 for correlating flow rates of liquid carbon dioxide into cooling tank 90 with flow rates of carbon dioxide vapor exiting the anti-backflow device 144. When the flow of liquid carbon dioxide is throttled back, a need arises for a flow of carbon dioxide purge gas, and an appropriate signal is sent by instrument panel 188 to open the control valve 202, thus providing a flow of purge gas.

Figure 6:
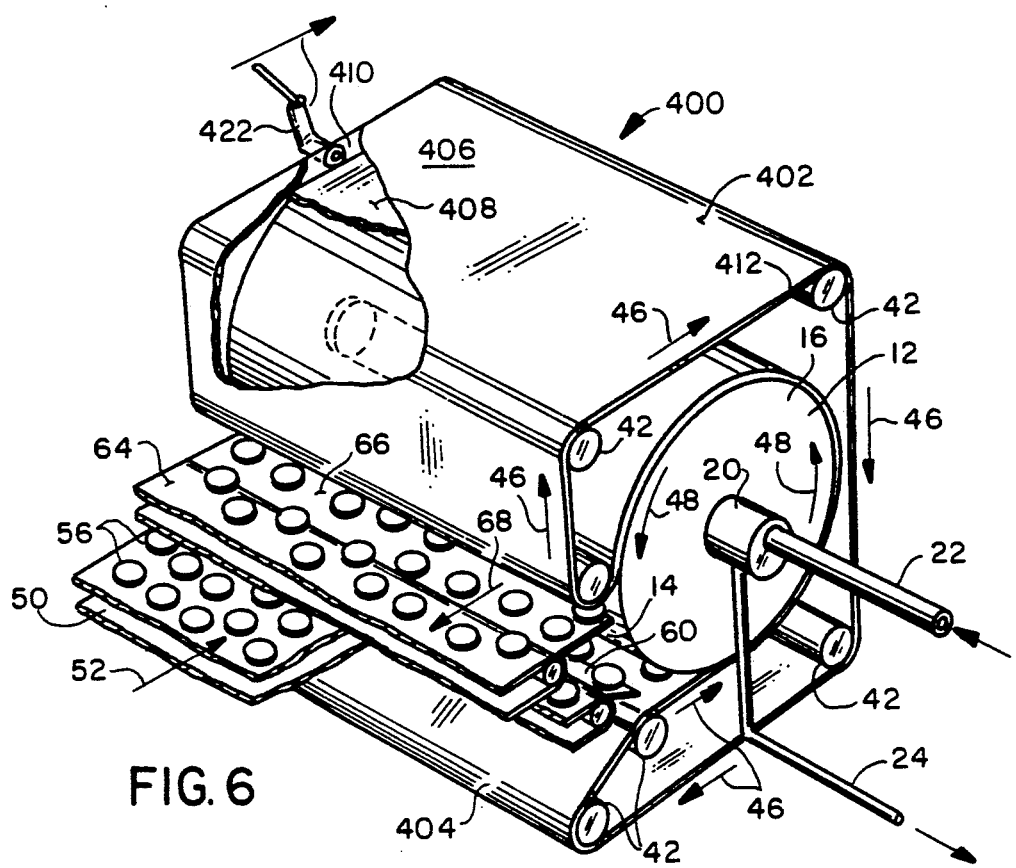
FIG. 6 is a perspective view of an alternative embodiment of a refrigerator apparatus according to the principles of the present invention.
Figure 7:
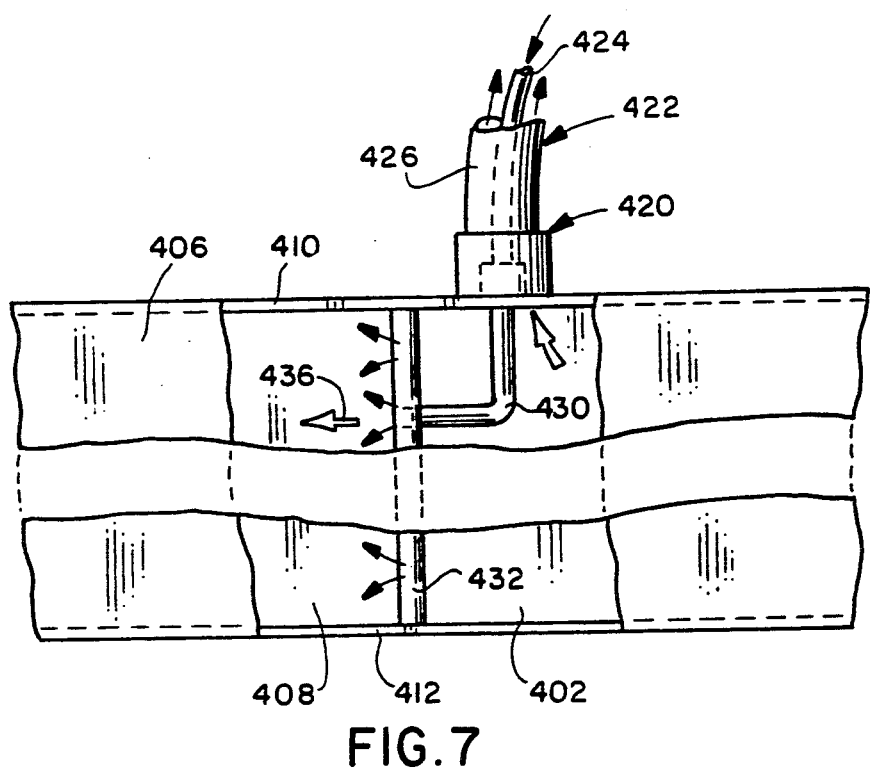
FIG. 7 is a fragmentary view of the conveyor belt of FIG. 6, shown partly broken away.

Turning now to FIGS. 6 and 7, an alternative embodiment of a refrigeration apparatus according to the present invention is generally indicated at 400. The refrigeration apparatus 400 is similar in many respects to the apparatus 10 described above, except for the lack of snow horns in the preferred embodiment of apparatus 400, and a hollow conveyor belt 402 through which refrigerated coolant, preferably D-Limonene is circulated. If desired, a covering of carbon dioxide snow or the like can be applied to the surface 404 of conveyor belt 402 in contact with freezing drum 12, although such is not expected to be necessary in light of the continual cooling of belt 402. The conveyor belt 402 travels about rollers 42 in the direction of arrows 46 with a portion of the belt path extending across the outer surface of freezing drum 12. Products 60 are received in the nip formed between the outer surface of drum 12 and the surface 404 of conveyor belt 402.

The hollow conveyor belt 402 is formed of two continuous, spaced apart walls, an outer wall 406 whose outer surface 404 contacts the freezer drum, and an inner wall 408. Sidewalls 410, 412 span the distance between inner and outer walls 408, 406 and seal the ends of the conveyor belt, thus forming a hollow cavity between walls 408, 406.

As shown in FIG. 7, a coaxial swivel coupling generally indicated at 420 is mounted to wall 410 and connects a coaxial line 422 to the hollow interior chamber of the conveyor belt. The line 422 includes an inner coaxial conduit 424 providing a feed for a refrigerated cooling medium to fill the hollow chamber of the conveyor belt. The outer coaxial line 426 provides a return path, or discharge to allow warmed coolant to be discharged from the conveyor belt chamber, to external refrigeration apparatus such as that illustrated in FIG. 3.

The swivel coupling 420 is connected through conduit 430 to a baffle wall 432 which divides the conveyor belt interior chamber. Disposed in baffle wall 432 are a series of outlet nozzles which direct incoming coolant in the direction of arrow 436. Refrigerated coolant is thereby made to traverse the length of the conveyor belt, returning to the swivel coupling 420 for discharge along conduit 426. As illustrated, coolant flows in a direction opposite to that of the conveyor belt travel, but could be made to flow in the same direction, if desired, by placing baffle wall 432 on the opposite side of swivel coupling 420 or by other conventional means which are apparent to those skilled in the art. The swivel coupling 420 follows the conveyor belt 402 as it travels about its defined path, the swivelling feature preventing entanglement of coaxial conduit 422. As with the aforementioned snow covering on the conveyor belt, the arrangement of apparatus 400 and the hollow conveyor belt 402 thereof provides cooling for the surfaces of product 56 facing away from drum 12.

The present invention also contemplates a static charge of refrigerated fluid coolant within the chamber of conveyor belt 402, although such is generally not preferred because of the reduced refrigerating capability that the conveyor belt would offer.

Significant cooling of the D-Limonene heat transfer fluid has been achieved. For example, the D-Limonene has been cooled to temperatures ranging between −20° to −100° F., in an insulated chamber using expanded liquid carbon dioxide to form solid particles of snow and carbon dioxide vapor in the D-Limonene fluid. The solid particles of carbon dioxide have been observed to mix thoroughly with the D-Limonene at a high velocity, and to cool the D-Limonene as the solid particles of carbon dioxide absorb heat and undergo a phase change, including sublimation.

With the carbon dioxide-cooled D-Limonene it is possible to provide a very fast freezing rate for food products, sufficient to kill or render dormant various strains of bacteria and other contaminating organisms have already been shown in a wide variety of food products. Also, as those skilled in the art will appreciate, it is imperative for various types of food products that a high freezing rate be provided, in order to avoid various types of degradation of the market value of the food products. The carbon dioxide cooling of the present invention provides such elevated freezing rates.

Additional advantages are also attained in cooling D-Limonene with carbon dioxide. It is important to exclude air and water vapor from entering tank 90, since either would cause contamination and degradation such as foaming of the D-Limonene fluid. With the present invention, carbon dioxide vapor is evolved at rates sufficient to prevent the intrusion of air and water.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Refrigeration apparatus for cooling a product, comprising:
   a drum of heat conducting material, having an outer wall with an inner surface and an outer product-contacting surface and defining an internal cavity sealed against contact with the product;
   means for rotatably mounting said drum;
   storage means for storing carbon dioxide refrigerant;
   inlet means for introducing the carbon dioxide refrigerant into the internal cavity of the drum so as to bring liquid carbon dioxide into contact with the inner surface of the drum outer wall;
   means for contacting the product with the outer drum surface so that the liquid carbon dioxide refrigerant absorbs heat from the product through the drum outer wall, causing at least a portion of the liquid carbon dioxide in the drum cavity to vaporize;
   means for removing the product from the outer drum surface;

outlet means for exhausting carbon dioxide vapor from the drum internal cavity; and means for liquefying the exhausted carbon dioxide vapor and for returning the carbon dioxide liquid to the storage means.

2. The apparatus of claim 1 wherein the carbon dioxide refrigerant comprises a pool of liquid in the drum without solids being present.

3. The apparatus of claim 1 wherein the carbon dioxide refrigerant comprises a pool of liquid and solids in the drum.

4. The apparatus of claim 1 wherein the means for liquefying the carbon dioxide vapor comprises mechanical compressor means.

5. The apparatus of claim 1 wherein the drum has a central axis of rotation whereat said inlet means and said outlet means are located.

6. The apparatus of claim 5 wherein said inlet means distributes liquid carbon dioxide refrigerant within said internal cavity and said drum is constructed so that the liquid carbon dioxide refrigerant falls relatively unimpeded to lower portion of the drum internal cavity so as to collect thereat in a pool in contact with the drum outer wall.

* * * * *